US006338446B1

(12) United States Patent
Wittebrood

(10) Patent No.: US 6,338,446 B1
(45) Date of Patent: Jan. 15, 2002

(54) METHOD OF REMOVING A METALLIC COATING LAYER FROM SCRAP METAL PIECES

(75) Inventor: Adrianus Jacobus Wittebrood, Velserbroek (NL)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/555,456

(22) PCT Filed: Dec. 18, 1998

(86) PCT No.: PCT/EP98/08528

§ 371 Date: Jul. 13, 2000

§ 102(e) Date: Jul. 13, 2000

(87) PCT Pub. No.: WO99/32260

PCT Pub. Date: Jul. 1, 1999

(30) Foreign Application Priority Data

Dec. 19, 1997 (EP) ............................................. 97204036

(51) Int. Cl.⁷ ........................... B02C 11/08; B24B 31/00
(52) U.S. Cl. ................................ 241/23; 241/DIG. 37; 241/79.1; 241/14; 419/32; 451/35; 75/401
(58) Field of Search ...................... 241/14, 23, DIG. 37, 241/79.1, 30; 419/32, 33; 451/32, 35; 75/401

(56) References Cited

U.S. PATENT DOCUMENTS

| 3,750,515 A | * | 8/1973 | Wasinger | .................... 83/559 |
| 4,129,443 A | * | 12/1978 | Kaufman | .................. 241/23 K |
| 4,662,570 A | * | 5/1987 | Heeren et al. | ............. 241/79.1 |
| 5,704,823 A | * | 1/1998 | Wittebrood | .................. 451/32 |

* cited by examiner

Primary Examiner—W. Donald Bray
(74) Attorney, Agent, or Firm—Stevens, Davis, Miller & Mosher, LLP

(57) ABSTRACT

A metallic coating layer is removed at least partly from scrap metal pieces having a core and the coating layer on the core. The coating layer has a lower melting temperature than the core. The scrap metal pieces are agitated in a container with abrading elements so as to cause multiple collisions, whereby the coating layer is at least partly removed. During the agitating the container temperature is a temperature T in the range $T_s(coat)<T<T_L(core)$ wherein $T_s(coat)$ is the solidus temperature of the coating layer and $T_L(core)$ is the liquidus temperature of the core. The agitation may be by rotationally tumbling or shaking the scrap metal pieces and the abrading elements.

13 Claims, No Drawings

METHOD OF REMOVING A METALLIC COATING LAYER FROM SCRAP METAL PIECES

FIELD OF THE INVENTION

This invention relates to a method of removing at least partly a metallic coating layer from scrap metal pieces, such as sheet pieces, having a core and the coating layer on the core, for example aluminium brazing sheet scrap. The coating layer has a lower melting temperature than the core. In this specification, $T_S(coat)$ and $T_L(coat)$ are defined as the solidus temperature and the liquidus temperature respectively of the metallic coating layer. $T_S(core)$ and $T_L(core)$ are defined as the solidus temperature and the liquidus temperature respectively of the core, i.e. the metal pieces without the metallic coating layer.

DESCRIPTION OF THE PRIOR ART

At different points in the production cycle during the manufacture of metal sheet parts which are provided on at least one side with a metallic coating, such as for example aluminium brazing sheet, coated scrap metal parts occur, such as rejected semi-finished products, cut-off edge parts, parts from the rolling process, stamping waste, etc. Processing such coated scrap metal parts poses various problems. For instance when melting coated scrap metal parts of brazing sheet, in which the cladding comprises an AlSi alloy, an excessive Si-level occurs in the aluminium melt obtained, so that the aluminium melt is no longer immediately suitable for the manufacture of a core alloy for brazing sheet. The aluminium melt is only suitable for lower grade applications unless the Si content is reduced by diluting the aluminium melt with pure aluminium, which is a costly solution.

EP-A-727499 describes a method in which coated metal pieces, particularly galvanized steel pieces, are agitated in a vessel together with abrasive elements, e.g. $Al_2O_3$ bodies, so as to cause multiple collisions. This removes the very thin zinc layer. Liquid, such as water or alkaline solution may also be present in the vessel. In some examples the process temperature is given as 80° C. This process is not thought suitable for relatively thick coating layers.

U.S. Pat. No. 4,203,762 discloses a method of processing bimetallic scrap, specifically steel/aluminium sheets, to recover aluminium without forming iron-aluminium intermetallic compounds. The scrap is rapidly heated by radiant heat energy in order to pass quickly through a critical temperature range starting at 450° C. to a temperature above the melting point of aluminium to render the coating liquid. The liquid coating is removed by gravitational drainage, for which purpose the scrap may be agitated. This process requires a high-temperature energy source and careful control.

SUMMARY OF THE INVENTION

It is an object of the invention to provide a method for effectively removing, at least partly, a metallic coating from scrap metal pieces carrying the metallic coating.

According to the present invention there is provided a method of removing at least partly a metallic coating layer from scrap metal pieces having a core and said coating layer on the core, the coating layer having a lower melting temperature than the core, comprising the step of agitating the scrap metal pieces in a container together with a plurality of abrading elements so as to cause multiple collisions therebetween, whereby said coating layer is at least partly removed. The method is characterised in that during the agitating the container temperature is a temperature T in the range $T_S(coat)<T<T_L(core)$ wherein $T_S(coat)$ is the solidus temperature of the coating layer and $T_L(core)$ is the liquidus temperature of the core. Preferably the container temperature T is in the range $T_L(coat)<T<T_S(core)$ in this way, a single feedstock of the coated scrap metal pieces may be brought into motion in such a way that constantly changing variations in speed occur between the coated scrap metal pieces and the abrading particles. It has been found that treating such scrap in this way removes the metallic coating or cladding surprisingly effectively, by mechanisms such as abrasion. With selection of the specified temperature range, the metallic coating or cladding when exposed to this temperature range appears to be very weak and possibly partly molten and can be removed simply and effectively by the abrasive action.

In the method of the invention, the scrap metal pieces may be introduced into the container at a temperature below the temperature $T_S(coat)$, e.g. at ambient or room temperature. Preferably the abrading elements, or at least some of them, are at the container temperature. The scrap metal pieces in this case are heated during the agitation but may not (and preferably do not) fully reach the temperature T. Thus the coating may not become fully molten. It seems that the coating becomes sufficiently weakened by the agitation and the temperature that it is removed from the core, possibly without melting.

It has been found that the method in accordance with the invention is particularly suitable for the removal of at least a part of the metallic coating of aluminium brazing sheet, in which the metallic coating, otherwise known as clad layer or cladding, is an aluminium brazing alloy comprising Si as main alloying element in a range of 5–15 wt. %. Also, layers of aluminium alloys comprising Zn as main alloying element can be removed very effectively.

The details of the method of the invention (e.g. time, temperature, size and type of abrading elements) should be selected so that the desired result of reduction of the amount of coating layer on the cores of the scrap metal parts is achieved. Under certain conditions there is a risk that detached coating particles may re-adhere to the scrap metal parts.

Suitably the abrading elements are lumps or particles of metal, mineral, ceramic or similar hard material. Preferably the abrading elements have irregular shapes such as lumps. Put also regular shapes such as pyramids or prisms can be used. The abrading elements are, for example, selected from $Al_2O_3$, SiC, spinel, bauxite, ardenner split, steel slag, and ceramic rotofinish elements with a hardness of at least 7.0 Mohs.

Although abrading elements of other materials may well be suitable, it is preferred to use one of those given above which are inert. The removed coating or cladding parts do not adhere significantly to these elements. Preferably the abrading elements used do not comprise to a significant extent any material that can react with molten aluminium possibly present during the agitation, such as mullite or $Fe_3Si$. When using abrading elements consisting of mullite, Si can be formed and this is disadvantageous for the final Si content of treated and subsequently remolten scrap metal parts.

The largest dimension of the abrasive particles is preferably maximum 100 mm, and more preferably maximum 20 mm. Especially in this range good results are achieved in removing metallic coatings in the given temperature range.

The efficiency of the removal of the clad layer is further improved when using a combination of relatively large abrasive elements (dimensional range 3–20 mm, preferably 4–20 mm) and small abrasive elements (dimensional range <2 mm). The weight ratio of the amount of "large" to "small" abrasive elements is in a range of 2:1 to 75:1, preferably 2:1 to 25:1 and more preferably 10:1 to 20:1.

Preferably the scrap metal pieces have maximum dimensions of not more than 200 mm, more preferably in the range 5–200 mm. Each piece may be regarded as having a length, width and thickness, with the maximum dimension being the length, the width being equal to or less than the length, and the thickness being small in comparison with the length and for example several mm, i.e. in the range 1 to 30 mm, preferably 1 to 10 mm. They may be obtained by a mechanical treatment comprising shearing, cutting or chopping.

Bringing the pieces and abrading elements into motion may be by one or both of rotational tumbling and shaking, and is carried out in a simple and effective manner in a rotating drum or vessel with an axis of rotation lying at no more than 45° relative to the horizontal. Preferably that the vessel comprises projections directed inwards for bringing the sheet parts into motion during rotation. This embodiment of the method in accordance with the invention can be applied on an industrial scale and employ known apparatus, e.g. apparatus known as rotofinish equipment. Instead of a rotating vessel there may be used vibrational equipment, such as a moving grid.

DESCRIPTION OF THE PREFERRED EMBODIMENTS

The invention will now be illustrated by reference to non-limiting examples.

EXAMPLE 1

The following was carried out on a laboratory test scale. A closed steel container was filled with $Al_2O_3$ particles as abrading particles with an average size of 2–5 mm. The container and the abrading particles were heated to 610° C. Aluminium alloy brazing sheets of 3×4 cm and 0.6 cm thick (including the cladding of 10% thickness) were introduced at room temperature to the heated container. The core alloy of the brazing sheet has $T_S$(core) 629° C. and $T_L$(core) 654° C., and the cladding has $T_S$(coat) 554° C. and $T_L$(coat) 596° C. The container was shaken for 8 minutes with a horizontal amplitude of 5 cm. Tests were carried out with a Frequency of motion of 50 and 120 motions per minute.

Table 1 lists the Si and Fe content of the remolten brazing sheets when remelted as function of the treatment. Following treatment removed cladding layer parts were found to be lying separately in the container between the $Al_2O_3$ particles and could be separated from both the scrap metal pieces and the $Al_2O_3$ particles using a simple sieving operation. It appears that the cladding layer may be cut away from the core by the abrading material.

The experiments show that, at least for a significant part, the cladding can be removed from the core alloy, so that a considerable added value of the remolten brazing sheet scrap sheet parts occurs because in particular the Si content decreases.

TABLE 1

| Treatment | Si | Fe | Mn |
| --- | --- | --- | --- |
| None (100% core alloy) | 0.06 | 0.19 | 1.09 |
| None (90% core alloy + 10% clad alloy) | 0.68 | 0.20 | 0.99 |
| after 8 min. at 50 mov/min. | 0.36 | 0.19 | 1.03 |
| after 8 min. at 120 mov/min. | 0.30 | 0.19 | 1.05 |

EXAMPLE 2

The following tests (experiments 1–18) were carried out on a laboratory test scale using a rotatable furnace drum with a longitudinal dimension of 0.3 m and a diameter of 0.3 m. In the drum an abrading medium is present in an amount of 6 kg, except for experiments 16–17 where 9 kg was used. The drum and the abrading medium are heated to the processing temperature, after which 1 kg of brazing sheet scrap, being at room temperature, is fed into the drum, except for experiment 17 where 1.5 kg has been used. The dimensions of the brazing sheet scrap are (25–30)×(40–60) mm, and 3 mm thick. The core aluminium alloy of the brazing sheet has $T_S$(core) 629° C. and $T_L$(core) 654° C., and the cladding has $T_S$(coat) 554° C. and $T_L$(coat) 596° C. The brazing sheet used has a core alloy having Si and Fe contents of 0.05 wt. % and 0.20 wt. % respectively, the cladding (10% of the thickness) comprising Si and Fe contents of 9.56 wt. % and 0.20 wt. % respectively. The composition of remelted brazing sheet without a treatment in accordance with the invention is 0.59 wt. % Si and 0.20 wt. % Fe. The minimum Si-level that can be obtained after processing is the Si-level of the core alloy.

As abrading medium the following components were used: $Al_2O_3$, Arden. (=Ardenner split) which is a mined mineral with sharp edges, bauxite which is the ore material for aluminium production and has also very sharp edges, and steel slag which is a by-product from the convertor-steel making process and is very heavy and has sharp edges and comprises a mixture of FeO, $Fe_2O_3$, CaO, $SiO_2$ and $Al_2O_3$.

Table 2 gives the Si and Fe content of the remelted brazing sheets as function of the treatment.

The results of experiments 7, 10, 12 and 14 show a comparison between the types of abrasive medium used. Surprisingly the use of steel slag gives very good results. An increase of the Fe-content in the remelted treated brazing sheet might be expected but the experimental results did not reveal this. For all experiments carried out no element showed a significant increase or decrease in the final treated brazing sheet, with the exception of the Si-content. Further the experimental results show that the cladding layer can be removed from the core alloy to a significant extent using abrading particles at elevated temperatures.

TABLE 2

| Experiment | Abrasive medium | Dimensional range (mm) | Weight (kg) abrasive medium | Weight (kg) Scrap | Processing temperature (° C.) | Rotating speed (rpm) | Processing time (min) | Content after processing (wt %) Si | Content after processing (wt %) Fe |
|---|---|---|---|---|---|---|---|---|---|
| 1 | $Al_2O_3$ | 3.0–5.0 | 6 | 1 | 575 | 20 | 30 | 0.42 | 0.21 |
| 2 | $Al_2O_3$ | 3.0–5.0 | 6 | 1 | 600 | 20 | 15 | 0.49 | 0.21 |
| 3 | $Al_2O_3$ | 3.0–5.0 | 6 | 1 | 600 | 20 | 25 | 0.58 | 0.21 |
| 4 | $Al_2O_3$ | 3.6–6.7 | 6 | 1 | 600 | 30 | 20 | 0.45 | 0.21 |
| 5 | $Al_2O_3$ | 3.7–6.7 | 6 | 1 | 600 | 30 | 150 | 0.38 | 0.21 |
| 6 | $Al_2O_3$ | 3.0–8.0 | 6 | 1 | 600 | 30 | 20 | 0.27 | 0.21 |
| 7 | $Al_2O_3$ | 3.0–8.0 | 6 | 1 | 620 | 30 | 20 | 0.31 | 0.21 |
| 8 | $Al_2O_3$ | 3.0–8.0 | 6 | 1 | 610 | 45 | 20 | 0.43 | 0.21 |
| 9 | $Al_2O_3$ | 5.0–15.0 | 6 | 1 | 600 | 30 | 20 | 0.33 | 0.21 |
| 10 | Arden | 8.0–16.0 | 6 | 1 | 620 | 30 | 20 | 0.34 | 0.21 |
| 11 | Arden | 8.0–16.0 | 6 | 1 | 620 | 30 | 20 | 0.34 | 0.21 |
| 12 | Bauxite | 5.0–15.0 | 6 | 1 | 620 | 30 | 20 | 0.25 | 0.21 |
| 13 | Bauxite | 5.0–15.0 | 6 | 1 | 620 | 30 | 20 | 0.32 | 0.21 |
| 14 | Steel slag | 4.0–16.0 | 6 | 1 | 620 | 30 | 20 | 0.18 | 0.21 |
| 15 | Steel slag | 4.0–16.0 | 6 | 1 | 600 | 30 | 20 | 0.28 | 0.21 |
| 16 | Steel slag | 4.0–16.0 | 9 | 1 | 620 | 30 | 20 | 0.20 | 0.21 |
| 17 | Steel slag | 4.0–16.0 | 9 | 1.5 | 635 | 30 | 20 | 0.23 | 0.21 |
| 18 | Steel slag | 4.0–16.0 | 6 | 1 | 635 | 30 | 20 | 0.16 | 0.21 |

EXAMPLE 3

In a similar manner as in Example 2 one kg of the same type of brazing sheet scrap was processed in a rotatable drum with variation of the type of abrasive medium, dimensional range of the abrasive medium and processing temperature (experiments 19–33). In addition to abrading materials of Example 2, commercial available ceramic elements for rotofinish operations with a hardness of 8.0 Mohs and various shapes have been tested. The ceramic rotofinish elements used are essentially made of $Al_2O_3$ and clay and have a specific weight of 2.52 g/cm$^3$. In experiments 19–21 pyramid shapes have been used, in experiment 22 triangle shapes, and in experiments 23–26 cylindrical shapes.

In experiments 24–27 and 30–32 an abrasive medium with relatively large dimensions was combined with a second abrasive medium with relatively small dimensions. The weight amount of the large abrasive medium is significantly higher than of the small abrasive medium. In experiment 27 steel disks with a diameter of 35 mm and a height of 9 mm were used in combination with bauxite.

Table 3 gives the Si and Fe content of the remelted brazing sheets as function of the treatment.

The experimental results of experiments 19–21 show that an increase in the dimensions of the abrasive medium reduces the efficiency of the clad layer removal. The experimental results of experiments 23–26 show that the efficiency of clad layer removal is increased significantly when adding a small amount of small abrading particles to the large abrading particles. From experiments 24 and 25 it can be seen that the removal efficiency is further improved when increasing the temperature.

Experiment 33 has been performed without any abrading particles but only with 6 kg of the scrap brazing sheet parts. It has been found that the cladding layer is not removed when tumbling only the scrap parts at elevated temperature.

TABLE 3

| Experiment | Abrasive medium Type | Abrasive medium Dimensional range (mm) | Weight (kg) | Processing temperature (° C.) | Rotating speed (rpm) | Processing time (min) | Content after processing (wt. %) Si | Content after processing (wt. %) Fe |
|---|---|---|---|---|---|---|---|---|
| 19 | RS 15 P | 15–16 | 6 | 610 | 30 | 20 | 0.42 | 0.21 |
| 20 | RS 25 P | 25–27 | 6 | 610 | 30 | 20 | 0.57 | 0.21 |
| 21 | RS 35 P | 35–39 | 6 | 610 | 30 | 20 | 0.60 | 0.21 |
| 22 | RS 20/20 D | 20 | 6 | 610 | 30 | 20 | 0.60 | 0.21 |
| 23 | RS 15/25 ZS | 15–25 | 6 | 610 | 30 | 20 | 0.60 | 0.21 |
| 24 | RS 15/25 ZS + bauxite | 15–25/<1 | 4/2 | 605 | 30 | 20 | 0.41 | 0.21 |
| 25 | RS 15/25 ZS + bauxite | 15–25/<1 | 4/2 | 615 | 30 | 20 | 0.21. | 0.21 |
| 26 | RS 15/25 ZS + bauxite | 15–25/<1 | 5/1 | 620 | 30 | 20 | 0.24 | 0.21 |
| 27 | steel + bauxite | φ 35/>1 | 6.7/0.5 | 610 | 30 | 20 | 0.23 | 0.21 |
| 28 | steel slag | <30 | 6 | 617 | 30 | 20 | 0.17 | 0.21 |
| 29 | steel slag | <6 | 6 | 615 | 30 | 20 | 0.16 | 0.21 |
| 30 | RS 15/25 ZS + bauxite | 15–25/<1 | 5.75/0.25 | 616 | 20 | 0.30 | 0.21 | |
| 31 | steel slag + bauxite | 4–16/<0.25 | 5.75/0.25 | 617 | 30 | 20 | 0.21 | 0.21 |
| 32 | steel slag + bauxite | 4–16/<2.0 | 5.75/0.25 | 617 | 30 | 20 | 0.19 | 0.21 |
| 33 | none | — | — | 620 | 30 | 20 | 0.59 | 0.21 |

EXAMPLE 4

In a similar manner as in Example 3 double cladded brazing sheet scrap has been processed in the rotatable drum.

The core alloy comprises 0.37 wt. % Si and 0.43 wt. % Fe. The untreated and remelted double cladded brazing sheet comprises 1.9 wt. % Si and 0.43 wt. % Fe. The process parameters used were: 1 kg scrap brazing sheet of (25–30)×(40–60) mm and 6.5 mm thick, 6 kg of steel slag particles in a dimensional range of 4–16 mm, furnace temperature 617° C., processing time 20 min, rotational speed 30 rpm. The treated and remelted brazing sheet comprised 0.47 wt. % Si and 0.43 wt. % Fe.

EXAMPLE 5

The following experiment was carried out on a laboratory scale. Brazing sheet having a dimensional range of 3×4 cm and 0.6 mm thick was placed at a temperature of 610° C. on a moving steel vibrating grid. The cladding layer was turned to face the steel grid. The grid was subsequently brought into motion at a frequency of 200 moves/min and a horizontal amplitude of 5 cm for a processing time of 1 minute. The treated brazing sheet was remelted and analysed for its Si- and Fe-content. The results in wt.% are listed in Table 4.

TABLE 4

|  | Si | Fe |
| --- | --- | --- |
| untreated core alloy | 0.18 | 0.52 |
| untreated brazing sheet (core + 10% cladding) | 0.72 | 0.52 |
| treated brazing sheet | 0.45 | 0.51 |

EXAMPLE 6

The following experiment containing two tests was carried out on a laboratory scale of testing wish a rotatable furnace drum with a longitudinal dimension of 0.3 m and a diameter of 0.3 m (similar to that used in Examples 2 to 4). In the drum an abrading medium is present in an amount of 6 kg. The drum and the abrading medium are heated in both tests to a processing temperature of 620° C., after which 1 kg of brazing sheet scrap, being at room temperature, is fed into the drum. The dimensions of the brazing sheet scrap pieces are (25–30)×(40–60) mm, and 3 mm thick. The core alloy of the brazing sheet has $T_S$(core) 629° C. and $T_L$(core) 654° C, and the cladding has $T_S$(coat) 555° C. and $T_L$(coat) 595° C. The brazing sheet core has a Si-content of 0.08 wt. %, and the cladding (10% of the thickness) a Si-content of 9.57 wt. %. The composition of remelted brazing sheet without treatment in accordance with the invention is 0.64 wt. % The minimum Si-level that can be obtained after processing is the Si-level of the core alloy, viz. 0.08 wt %.

In the first test an abrading medium in the form of 5.5 kg of steel slag as described in Example 2 with a dimensional range of 15 to 25 mm, together with 0.5 kg of $Al_2O_3$ with a dimensional range of 3 to 8 mm was used.

In the second test an abrading medium in the form of 5.5 kg of steel slag as described in Example 2 with a dimensional range of 15 to 25 mm, together with 0.4 kg of $Al_2O_3$ with a dimensional range of 3 to 8 mm, and further 0.1 kg of steel slag sand (the fine fraction of steel slag) having a dimensional range of up to 1 mm has been used.

In both tests the brazing sheet scrap was processed several times for 20 minute periods with a rotational speed of 30 rpm. After each 20 minute period the treated brazing sheet scrap is taken out, remelted and analysed for its Si-content, and further new untreated brazing sheet scrap is added into the drum. In the first test after each processing the abrading medium is sieved in order to remove abrading material having dimension of less than 1 mm, and allowed to reach the processing temperature again. In the first test this process was repeated 7 times and in the second test this process was repeated 5 times. The percentage of Si removed has been calculated using the following equation:

$$\text{Si removed} = \left(1 - \frac{[(\text{Si after proc.}) - \text{Si(core)}]}{[(\text{Si remelt total scrap}) - \text{Si(core)}]}\right) \times 100\%$$

and where Si (remelt total scrap) is 0.64 wt. % and Si(core) is 0.08 wt. %.

The results for the first test are listed in Table 5, and for the second test in Table 6. From these results it can be seen that the processing efficiency of removing the cladding determined by means of the Si-content, decreases with time. In this experiment the efficiency gradually decreases from about 80% to about 40%. However, from the results of the second test it can be seen that with the presence of a fraction fine abrading elements, in this case steel slag sand having dimensions of less than 1 mm, the efficiency remains almost constant over the various experiments. A possible explanation might be that the fine fraction acts as an absorbent, preventing the removed clad layer adhering to the scrap brazing sheet again.

TABLE 5

| Process no. | Si content of remelt (wt. %) | Si removed (%) |
| --- | --- | --- |
| 1 | 0.22 | 77 |
| 2 | 0.30 | 65 |
| 3 | 0.33 | 60 |
| 4 | 0.39 | 50 |
| 5 | 0.42 | 46 |
| 6 | 0.44 | 43 |
| 7 | 0.44 | 43 |

TABLE 6

| Process no. | Si content of remelt (wt. %) | Si removed (%) |
| --- | --- | --- |
| 1 | 0.20 | 80 |
| 2 | 0.21 | 79 |
| 3 | 0.23 | 75 |
| 4 | 0.22 | 77 |
| 5 | 0.20 | 80 |

I claim:

1. A method of removing at least partly a metallic coating layer from scrap metal pieces having a core and said coating layer on the core, the coating layer having a lower melting temperature than the core, comprising the step of agitating the scrap metal pieces in a container together with a plurality of abrading elements so as to cause multiple collisions therebetween, whereby said coating layer is at least partly removed, wherein during the agitating the container temperature is a temperature T in the range $T_S(\text{coat}) < T < T_L(\text{core})$ wherein $T_S(\text{coat})$ is the solidus temperature of the coating layer and $T_L(\text{core})$ is the liquidus temperature of the core.

2. The method according to claim 1, wherein said temperature T is in the range $T_L(\text{coat}) < T < T_S(\text{core})$ wherein $T_L(\text{coat})$ is the liquidus temperature of the coating layer and $T_S(\text{core})$ is the solidus temperature of the core.

3. The method according to claim 1 or wherein said agitating step to cause multiple collisions is carried out by at least one of (i) rotationally tumbling said scrap metal pieces and said abrading elements in said container and (ii) shaking said scrap metal pieces and said abrading elements in said container.

4. The method according to claim 1, wherein said scrap metal pieces are brazing sheet parts.

5. The method according of claim 1, wherein said coating layer is aluminium brazing alloy.

6. The method according to claim 5, wherein said aluminium brazing alloy contains Si in an amount of 5 to 15 wt % based on the weight of the aluminium brazing alloy.

7. The method according to claim 5, wherein said aluminium brazing alloy contains Zn as main alloying element.

8. The method according to claim 5, wherein said abrading elements are of material which is chemically inert to aluminium at said temperature T.

9. The method according to claim 1, wherein said abrading elements are selected from $Al_2O_3$ elements, SiC elements, spinel elements, bauxite elements, ardenner split, steel slag, and ceramic rotofinish elements having a hardness of at least 7 Mohs.

10. The method according to claim 1, wherein said abrading elements have maximum dimensions of not more than 100 mm.

11. The method according to claim 10, wherein said abrading elements have maximum dimensions of not more than 20 mm.

12. The method according to claim 1, wherein said scrap metal pieces have maximum dimensions of not more than 200 mm.

13. The method according to any claim 1, wherein said abrading elements comprise an amount (A) of relatively large elements having their maximum dimensions in the range 3 to 20 mm, and an amount (B) of relatively small elements having their maximum dimensions in the range of <2 mm, the weight ratio A:B being in the range 2:1 to 75:1.

* * * * *